Dec. 24, 1957  A. L. MEYER, JR., ET AL  2,817,449
BALE SWEEP
Filed Aug. 28, 1956  2 Sheets-Sheet 1
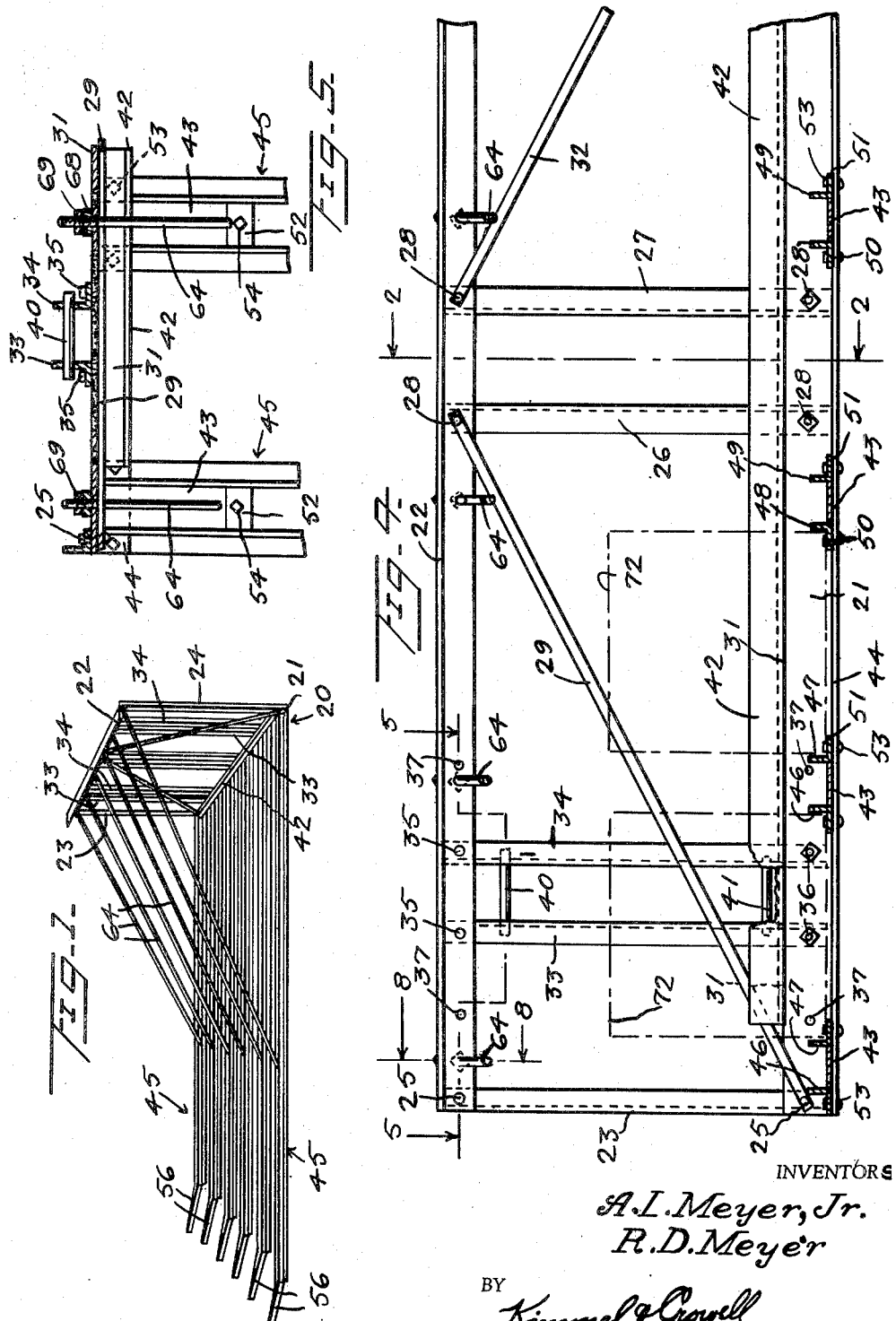
INVENTORS
A. L. Meyer, Jr.
R. D. Meyer
BY
Kimmel & Crowell
ATTORNEYS

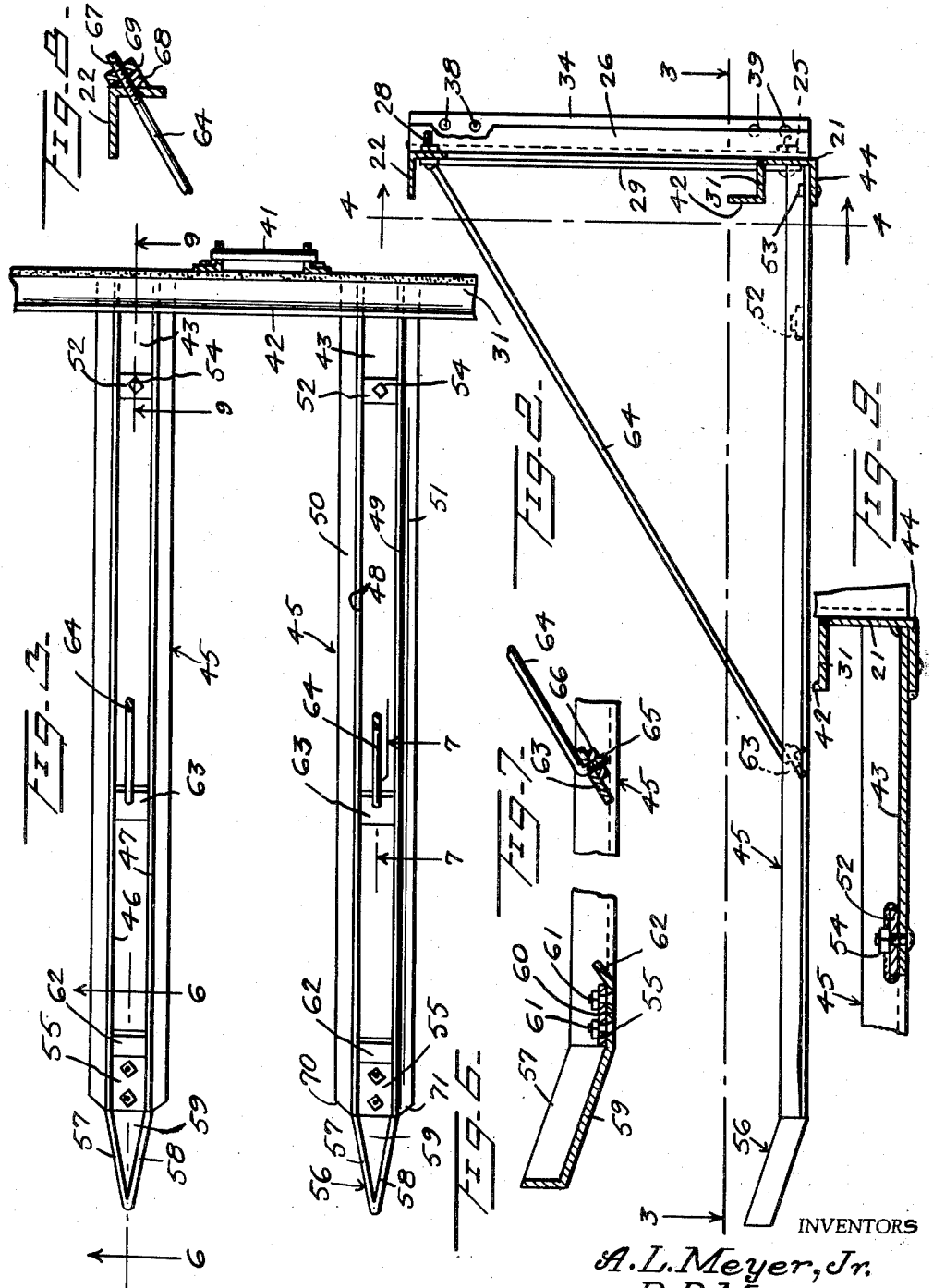

United States Patent Office 2,817,449
Patented Dec. 24, 1957

2,817,449

BALE SWEEP

Alvin L. Meyer, Jr., and Roy Dee Meyer, Fairfield, Mont.

Application August 28, 1956, Serial No. 606,667

1 Claim. (Cl. 214—145)

The present invention relates to bale sweeps, and more particularly is intended as a bale lifting device for attachment to existing farm loaders.

The primary object of the invention is to provide a device which will lift and store a quantity of bales from their position in the field so that they may be carried to a discharge point.

Another object of the invention is to provide a bale sweep of the class described above which can be readily adjusted to fit farm loaders of differing characteristics.

A further object of the invention is to provide a bale sweep of the class described above which is adapted to engage a bale and align the bale for engagement of other portions of the sweep therewith.

A still further object of the invention is to provide a bale sweep of the class described above which is inexpensive to manufacture, simple to use and attach, and which will operate more efficiently than previously available devices of this character.

Other objects and advantages will become apparent in the following specification when considered in the light of the attached drawings, in which:

Figure 1 is a perspective view of the device.

Figure 2 is a vertical cross-section taken along the line 2—2 of Figure 4, looking in the direction of the arrows.

Figure 3 is a fragmentary horizontal cross-section taken along the line 3—3 of Figure 2, looking in the direction of the arrows.

Figure 4 is a fragmentary enlarged transverse cross-section taken along the line 4—4 of Figure 2, looking in the direction of the arrows.

Figure 5 is a fragmentary horizontal cross-section taken along the line 5—5 of Figure 4, looking in the direction of the arrows.

Figure 6 is a fragmentary vertical cross-section taken along the line 6—6 of Figure 3, looking in the direction of the arrows.

Figure 7 is a fragmentary vertical cross-section taken along the line 7—7 of Figure 3, looking in the direction of the arrows.

Figure 8 is a fragmentary vertical cross-section taken along the line 8—8 of Figure 4, looking in the direction of the arrows.

Figure 9 is a fragmentary longitudinal cross-section taken along the line 9—9 of Figure 3, looking in the direction of the arrows.

Referring now to the drawings in detail wherein like reference characters indicate like parts throughout the several figures, the reference numeral 20 indicates generally a bale sweep constructed in accordance with the invention.

The bale sweep 20 includes a transversely extending elongated angle iron 21 and a transversely extending vertically spaced angle iron 22 arranged in parallel relation above the angle iron 21. A pair of spaced parallel upright angle irons 23 and 24 are secured to the opposite ends of the angle iron 22 and the angle iron 21 by suitable means, such as bolts 25. A pair of spaced parallel vertically extending angle irons 26 and 27 are positioned medially between the angle irons 23 and 24 and are secured to the angle iron 21 at one end and the angle iron 22 at the other end by suitable bolts 28. The angle irons 26 and 27 are parallel to the angle irons 23 and 24.

A diagonal brace 29 extends from the lower end of the angle iron 23 to the upper end of the angle iron 26 and is secured thereto by the bolts 25 and 28, respectively. An identical diagonal brace 32 extends between the upper end of the angle iron 27 and the lower end of the angle iron 24 where it is secured by the bolts 28 and 25, respectively.

A pair of vertically extending spaced apart parallel angle irons 33 and 34 extend between the angle iron 21 and the angle iron 22 in parallel relation and adjacent to the angle iron 23. The angle irons 33 and 34 are secured at their upper ends to the angle iron 22 by means of bolts 35 and at their lower ends to the angle iron 21 by means of bolts 36. The angle iron 22 and the angle iron 21 are provided with a plurality of spaced bores 37 to permit the angle irons 33 and 34 to be attached thereto in laterally adjusted positions. The angle irons 33 and 34 are provided with vertically spaced bores 38 adjacent the upper ends and vertically spaced bores 39 adjacent the lower ends to receive upper and lower transverse pins 40 and 41, respectively.

A second pair of spaced parallel vertically extending angle irons 33 and 34 extend between the angle iron 21 and the angle iron 22 adjacent the angle iron 23, as best shown in Figure 1. The angle irons 33 and 34 adjacent the angle iron 24 are identical in every respect with the angle irons 33 and 34 adjacent the angle iron 23 and are identically equipped.

An angle iron 31 is secured to the upper edge of the angle iron 21 and is provided with an upright flange 42 for reasons to be assigned. A plurality of spaced parallel forwardly extending rectangular plates 43 are welded or otherwise secured to the upper surface of the horizontal flange 44 of the angle iron 21 in equi-spaced relation therealong.

A plurality of forwardly extending teeth 45 are secured to the angle iron 21 in a manner to be described.

Each of the teeth 45 comprise a pair of spaced parallel angle irons 46 and 47 having adjacent vertical flanges 48 and 49 and oppositely extending horizontal flanges 50 and 51, as best seen in Figures 3 and 4. A rectangular plate 52 extends between the angle irons 46 and 47 adjacent the rear end portion thereof and is welded thereto to secure the angle irons 46 and 47 in spaced relation. The rectangular plate 52 is spaced above the bottom edge of the angle irons 46 and 47 so that the angle irons 46 and 47 can extend alongside of the plate 43 with the plate 52 in contact with the upper surface thereof adjacent the outer end thereof, as shown in Figure 9. The horizontal flanges 50 and 51 of the angle irons 46 and 47 are secured at their rear end portions to the flange 44 of the angle iron 21 by means of bolts 53, and the plate 52 is secured to the plate 43 by means of a bolt 54.

The forward end of the angle irons 46 and 47 are connected by a rectangular plate 55 which is positioned adjacent to but spaced above the lower edges thereof and welded thereto. A guide tooth generally indicated at 56 comprises a pair of forwardly converging side walls 57 and 58 and a forwardly and upwardly sloping pointed bottom wall 59 which is secured to the lower edges of the side walls 57 and 58. The bottom wall 59 is provided with a horizontal rectangular extension 60 which is adapted to engage between the angle irons 46 and 47 below the rectangular plate 55, as seen in Figures 3 and 6.

Bolts 61 extend through the rectangular plate 55 and the rectangular extension 60 to secure the guide tooth 56 to the forward end of the tooth 45. The rectangular extension 60 is provided with an upwardly sloping rear end portion 62, as seen in Figures 3 and 6, to act as a guide for the tooth 45 when being moved rearwardly.

A rectangular plate 63 extends between and is welded to the angle irons 46 and 47 intermediate their ends and arranged to slope downwardly and forwardly, as shown in Figure 7. A forwardly and downwardly sloping brace rod 64 is provided with an offset end portion 65 extending through the plate 63. The end portion 65 is threaded to receive a nut 66 securing the offset end portion 65 to the plate 63, as shown in Figure 7.

The upper rear end of the rod 64 is threaded at 67 and extends through the angle iron 22, as shown in Figure 8. A wedge-shaped washer 68 is positioned over the rod 64 to engage against the angle iron 22 to provide a level support for the securing nut 69 engaged over the threaded end portion 67 thereof.

It should be noted that the forward ends of the horizontal flanges 50 and 51 of the angle irons 46 and 47 are rearwardly tapered as at 70 and 71 to assist in guiding the tooth 45 under a bale to be lifted. It should be also noted that the rear vertical edges of the side walls 57 and 58 of the tooth 56 engage the forward vertical edges of the flanges 48 and 49 of the angle irons 46 and 47 to assist in bracing the tooth 56.

In the use and operation of the invention, the pins 40 and 41 are engaged with portions of a power operated farm loader (not shown) so that the bale sweep 20 can be raised and lowered as well as moved horizontally through a field by power means. The bale sweep 20 is moved through a field over which a baler has passed dropping baled material in its path. As the sweep 20 is moved through the field, the bales are engaged lengthwise between the teeth 56 and move inwardly between the teeth 45 until they come into engagement with the upstanding flange 42 on the angle iron 31.

Referring now to Figure 4, it will be seen that the bales are indicated by a rectangular broken line 72 and that they rest on the horizontal flanges 50 and 51 on adjacent teeth 45. It should be noted that the length of the teeth 45 is such that a plurality of bales 72 can be arranged thereon longitudinally as the bale sweep 20 passes through the field. After the teeth 45 are completely loaded with bales 72, the sweep 20 is moved to a discharge point and the bales 72 are removed therefrom by drawing the teeth 45 from beneath them.

It should be noted that the vertical angle irons 33 and 34, as well as the pins 40 and 41 can be adjusted with relation to the sweep 20 to permit its attachment to farm loaders of differing characteristics. It should also be noted that the rods 64 can be adjusted in length by means of the nut 69 so that the outer end of the teeth 45 can be adjusted as needed.

Having thus described the preferred embodiment of the invention, it should be understood that numerous structural modifications and adaptations may be resorted to without departing from the scope of the appended claim.

What is claimed is:

A bale sweep comprising a generally rectangular upright frame, a plurality of spaced parallel elongated teeth secured to the lower end of said frame and extending forwardly therefrom, said teeth each including a pair of spaced parallel angle iron members having adjacent upright legs and oppositely extending horizontal legs, spacers extending between and secured to said angle iron members, an upwardly and forwardly sloping forwardly converging guide secured to the forward end of each of said teeth, and a support rod secured to the forward end portion of each of said teeth at one end and extending upwardly and rearwardly therefrom and adjustably secured to the upper portion of said upright frame for adjustably supporting the forward end portion of each of said teeth.

References Cited in the file of this patent

UNITED STATES PATENTS

| | | |
|---|---|---|
| 1,571,398 | Durgin | Feb. 2, 1926 |
| 1,773,446 | Butler | Aug. 19, 1930 |
| 1,821,798 | Goss | Sept. 1, 1931 |
| 2,398,585 | Hayward | Apr. 16, 1946 |
| 2,632,575 | Geraldson et al. | Mar. 24, 1953 |